(12) United States Patent
Tyckowski

(10) Patent No.: US 6,298,295 B1
(45) Date of Patent: Oct. 2, 2001

(54) WINDOW OBJECT DETECTION WITH START-UP COMPENSATION

(75) Inventor: Joseph Tyckowski, Clawson, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/596,126

(22) Filed: Jun. 16, 2000

(51) Int. Cl.$^7$ ................................................ B66B 13/14
(52) U.S. Cl. ............................................. 701/49; 318/455
(58) Field of Search .................. 701/49, 29; 318/282, 318/283, 455, 461, 466, 467, 468, 474

(56) References Cited

U.S. PATENT DOCUMENTS

| | | | |
|---|---|---|---|
| 4,342,379 | * | 8/1982 | Games et al. ................ 187/29 R |
| 5,864,104 | * | 1/1999 | Tawada et al. ................. 187/316 |

* cited by examiner

*Primary Examiner*—Tan Nguyen
(74) *Attorney, Agent, or Firm*—Carlson, Gaskey & Olds

(57) ABSTRACT

A window obstruction identification system is tailored to better identify obstructions at start-up. The limit at start-up is set based upon the first peak value in a direction away from the direction expected for an obstruction. In the case of monitoring speed, the limit is set based upon the first upper peak. The limit is set to be a scaler far less than 1 times this peak. In this way, the limit does not vary with the upcoming expected valleys. In the prior art, an obstruction at start-up was sometimes identified as an expected valley, and thus not quickly identified. In a second embodiment, current is monitored. In a current monitored system, it is the first valley which is utilized to set the limit. In such a case, the valley is multiplied by a scaler which is greater than 1. The disclosed system also accounts for system hysteresis by setting the scaler value to two different values based upon prior movement if the system is subject to significant hysteresis.

13 Claims, 2 Drawing Sheets

WINDOW OBJECT DETECTION WITH START-UP COMPENSATION

BACKGROUND OF THE INVENTION

This invention relates to a method of detecting obstruction in the path of a moving closure, wherein a detection limit is set to identify obstructions at start-up.

Vehicle closures, such as windows, moonroofs, sunroofs, etc. are typically powered by a motor at the request of an operator closure switch. As the closure moves to close an opening in the vehicle cab, there may sometimes be an obstruction in the path of the closure. An obstruction, such as a passenger's arm, will increase the load on the motor closing the closure, or decrease the speed. Typically, a control system for the closure motor monitors a characteristic such as speed, power or torque, and identifies an obstruction should the monitored characteristic change more than a predetermined limit away from a predicted value.

Difficulties arise in setting the predicted value to correspond to the particular system dynamics for the closure in the vehicle. Further, other challenges, such as variations to the actual characteristic due to vibration, temperature, etc. may vary the monitored characteristic, for a reason other than obstruction.

To provide a more accurate indication of an obstruction, some systems have monitored the actual system response, and utilize that monitored system response as an indication of what the true predicted value should be. That is, some form of a "learn" cycle is utilized.

Closure systems typically monitor start-up changes. Typically, a start-up change would include a first upper peak, and then repeated decaying lower and upper peaks. However, a system that monitors start-up peaks, and utilizes the start-up peaks as "learned" expected value, will not always provide an accurate indication of an obstruction at start-up. That is, if an obstruction would give rise to a lower value than expected (such as a system monitoring speed) a lowered value at start-up might be seen as one of the valleys that follow the peak at start-up. Thus, there is the potential for missing an identification of an obstruction in a system which learns the system response and utilizes start-up values.

SUMMARY OF THE INVENTION

In a disclosed embodiment of this invention, an initial value is utilized to set a limit. The initial value is selected in a direction away from the change in the monitored characteristic which is expected due to an obstruction. Thus, in the case of speed, an initial upper value is utilized, and multiplied by a scaler to set a fixed limit for start-up. If the monitored value crosses this fixed limit, then an obstruction is indicated. By utilizing this first upper value, the system will not identify the expected decaying valleys as crossing a limit. The system will, however, also be able to distinguish between an obstruction during the start-up time and those expected valleys.

In a preferred embodiment, the scaler multiplied by the initial upper maximum peak is selected to be less than the ratio of the first valley divided by the first peak. That is, the scaler is selected to be somewhat less than 1. In this way, a limit is selected which will identify obstructions even at start-up. This limit can merge into a distinct limit or predicted value after a short start-up period, or could be utilized during the entire closure.

In a system monitoring power, it is the initial valley or minimum value which is utilized to select the limit. In such a case, the scaler is selected to be greater than 1, and also greater than the ratio of the maximum current value divided by the minimum current value.

Finally, the disclosed invention recognizes the effect of system hysteresis. This is a recognition that the system response at start-up will be different dependent on the previous movement of the window. If the previous movement was closing, typically the peaks and valleys tend to be more pronounced than if the previous movement was opening. The present invention thus may select different scaler values that can be utilized dependent on the last movement. The control will remember the last movement and select the appropriate scaler value to set the appropriate limit.

These and other features of the present invention can be best understood from the following specification and drawings, the following of which is a brief description.

DETAILED DESCRIPTION OF A PREFERRED EMBODIMENT

Figure 1:
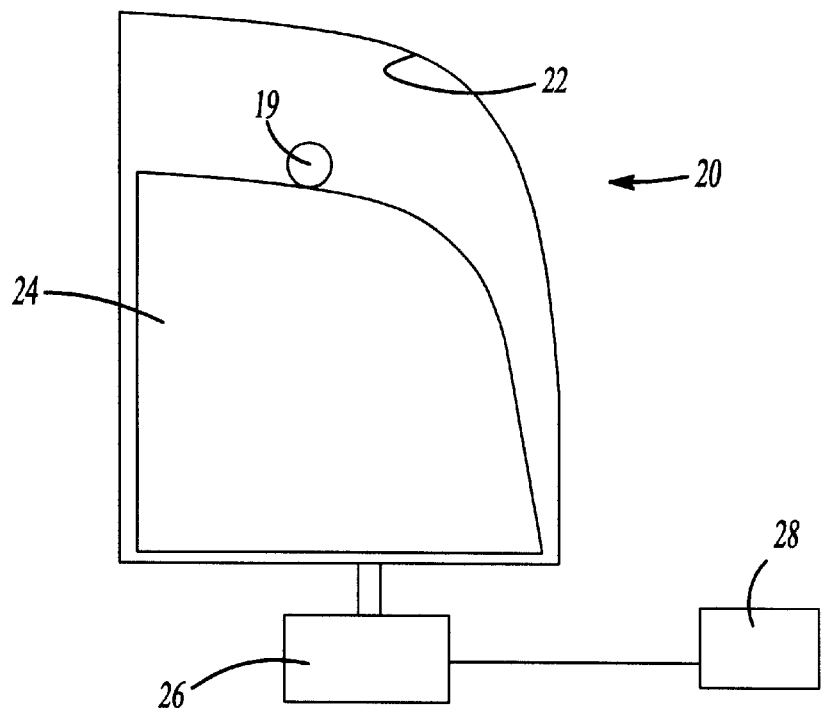
FIG. 1 is a schematic view of a window system.

FIG. 1 shows a system 20 driving a closure member 24 into a frame 22. A motor and control is shown schematically at 26. As known, an operator closure switch 28 actuates the motor 26 to close the closure 22. The control monitors a characteristic during this movement, and compares monitored values of the characteristic to expected values and a limit. If the limit is crossed by the monitored values, then the control can identify that an obstruction is encountered by the closure. If so, the motor is either stopped or reversed.

Figure 2:
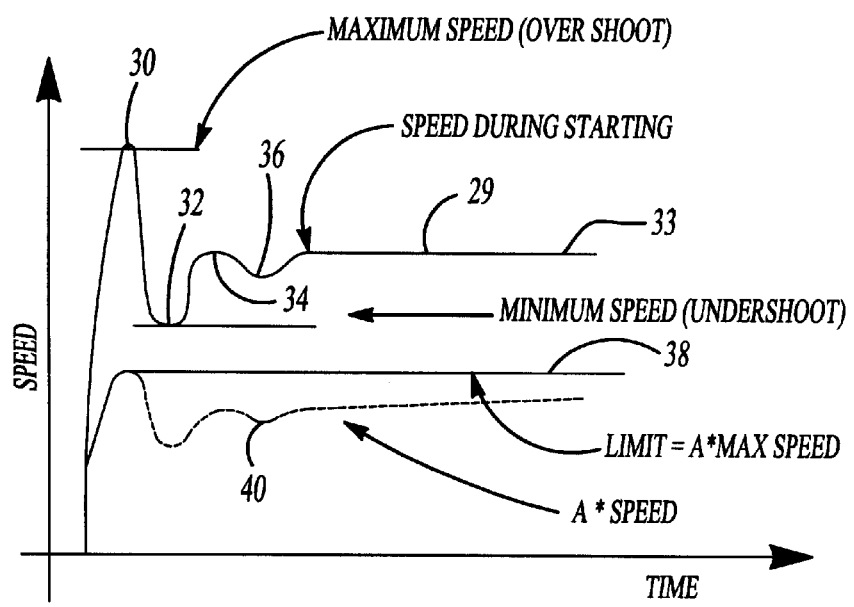
FIG. 2 is a graph of a first embodiment when no object is present.

FIG. 2 shows a typical system response 29 to a monitored characteristic. The monitored characteristic 29 is speed in this case.

As shown, at start-up there is an initial upward peak 30, and a corresponding valley 32. The term "peak" and "valley" are to be understood when compared to the steady state speed characteristic 33 after a start-up transient. As can be seen, there is a smaller peak 34 and a smaller valley 36.

The present invention sets a limit for the operation, at least during start-up which is selected by the following equation:

$$\text{Limit} = \text{Max speed} \times A$$

A is selected to meet the following equation:

$$A < \text{minimum speed} / \text{maximum speed}$$

(in FIG. 2, this is 32/30).

The limit is fixed by the maximum value, and does not vary after the first peak is reached. Thus, the limit is shown at 38 in FIG. 2. If the limit varied with the actual speed, the limit would look more like the dashed line 40.

Figure 3:
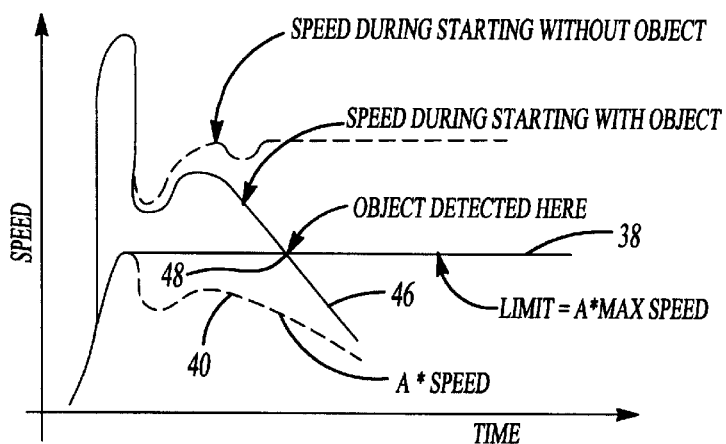
FIG. 3 shows a first embodiment when an object is present.

As shown in FIG. 3, the system response 46 for operation under an obstruction crosses the limit 38 at point 48. Thus, an obstruction is quickly identified. If the limit were to be varied with the speed, such as shown at 40, the limit would drop off with the dropping speed due to the obstruction. That is, the system would identify an obstruction as a "valley" and would move the limit downwardly, missing the identification of the obstruction until later.

In sum, the present invention could be stated as utilizing an initial peak in a value during start-up to set a limit. The peak is in the opposed direction to the movement of the characteristic upon sensing an obstruction. That is, in the FIG. 1 embodiment, since an obstruction moves the value downwardly the first upward peak is utilized to set the limit.

Figure 4:
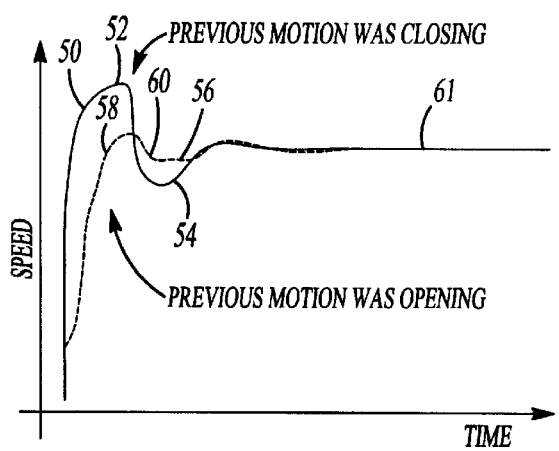
FIG. 4 shows the effect of on the system characteristic based upon last movement.

FIG. 4 shows another feature. As shown in FIG. 4, a first response 50 has a high peak 52 and a low peak 54. A second response 56 has a much smoother peak 58 and valley 60. Both reach a common steady state value 61. The response 50 is what would be expected in speed if the previous motion of the window was closing prior to the monitored movement. The response 56 shows the expected response if the previous motion was opening.

By recognizing the difference in start-up values dependent on the previous motion of the window the present invention accounts for a phenomenon called system hysteresis. That is, the previous motion affects the speed. A different value of the scaler A will thus perhaps be selected by the control dependent on the previous motion. Thus, the control might store two values of A to be utilized to set the initial limits, with a first value being selected for the previous movement being closing and a second value for the previous movement being opening.

Figure 5:
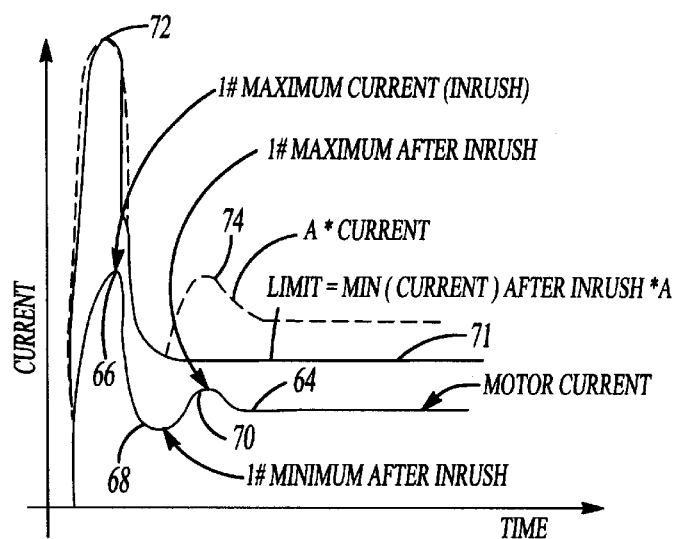
FIG. 5 shows a second embodiment.

As shown in FIG. 5, a second embodiment monitors motor current 64. In such a case, when an obstruction is encountered, the motor current increases. The motor current has a first maximum value 66 and a first peak 68. As with the prior embodiment, there are decaying further peaks 70 as in the prior embodiment. In this case, the limit 71 is set to have a peak 72 corresponding to the peak 66. However, after this peak, the rest of the limit is based upon the minimum value 68. In this way, the second peak 70 will not effect the limit. If the second peak 70 were utilized to vary the limit, then an obstruction at the time of the second peak 70 could be identified as simply the next peak, and ignored.

As shown, if the corresponding peak 70 were accounted for, there would be a peak 74 in the limit. The line 74 also shows the limit if it were varied with the speed as the speed value varies. However, the limit is instead set by the following equation:

$$\text{limit} = \text{Min current} \times A$$

after the first in rush.

A is selected to meet the following equation:

$$A > \text{max current}/\text{min current}.$$

Now, the present invention provides a system wherein after the first current end rush, the limit is set based upon the minimum value 68. As should be understood, an obstruction will increase the current, and thus the current would move upwardly above the expected current value 64. By setting the limit, at least during starting, based upon the first lower value 68, the present invention does not identify an obstruction after the value 68 as merely being the next peak, such as peak 70, and adjust the limit based upon this falsely identified "second peak."

In sum, the present invention utilizes a limit which is adjusted after a first start-up value in the direction opposed to the direction the characteristic will move in the event an obstruction is encountered. By setting the limit in this way, the present invention is better able to identify an obstruction should one occur at start-up.

Preferred embodiments of this invention have been disclosed; however, a worker in this art would recognize that modifications would come within the scope of this invention. For that reason, the following claims should be studied to determine the true scope and content of this invention.

What is claimed is:

1. A method of monitoring the closure of a closure on a vehicle comprising the steps of:
   (1) monitoring a system characteristic during a closure movement;
   (2) identifying a first extreme value of said characteristics after starting movement of said closure to a closed position, and in a direction opposed to a direction change that would be expected in said characteristic due to an obstruction;
   (3) utilizing the first monitored extreme value multiplied by a scaler to set a limit to be compared to said monitored characteristic; and
   (4) continuing to monitor said characteristic, and identifying an obstruction if said monitored characteristic crosses said limit.

2. A method as set forth in claim 1, wherein said monitored characteristic is speed, and said first extreme value is a first maximum value in speed, said first maximum value being multiplied by a scaler which is less than 1.

3. A method as set forth in claim 2, wherein said scaler is selected to be less than the ratio of said first maximum speed divided by a first minimum speed which follows said first maximum speed.

4. A method as set forth in claim 1, wherein said characteristic is one in which a monitored value will increase if an obstruction is identified, and said extreme value is a minimum value.

5. A method as set forth in claim 4, wherein said monitored characteristic is motor current.

6. A method as set forth in claim 4, wherein a limit is set which is spaced from a first peak value during the time period corresponding to said first peak value, and said limit then being changed to be said first minimum value multiplied by said scaler after said first peak value.

7. A method as set forth in claim 1, wherein distinct scalers are utilized to set said limit based upon whether the last movement of said closure was closing or opening.

8. A vehicle closure system comprising:
   a movable closure for use on a vehicle;
   a motor for driving said movable closure, and a control for monitoring operation of said motor; and
   said control being operable to monitor a characteristic, and identify a first extreme value in said characteristic after starting of movement of said closure, said first extreme characteristic being defined as the first extreme value in a direction opposed to the change in the characteristic which would be expected when an object is encountered, and said control being operable to set a limit for comparison to monitored values, said limit being set by a scaler multiplied by said first extreme value.

9. A system as recited in claim 8, wherein said monitored characteristic is speed, and said first extreme value is a first upper peak in a monitored speed.

10. A system as recited in claim 9, wherein said scaler is less than one.

11. A system as set forth in claim 10, wherein said scaler is set to be less than a minimum first peak in said speed divided by a maximum first peak.

12. A system as set forth in claim 8, wherein said monitored characteristic is current.

13. A system as set forth in claim 12, wherein said control does not utilize said first upper value to set said limit, but utilizes a first lower value to set said limit.

* * * * *